Aug. 8, 1939.  G. A. LYON  2,168,354
ORNAMENTAL GRILLE AND FENDER GUARD
Filed July 29, 1937  3 Sheets-Sheet 1
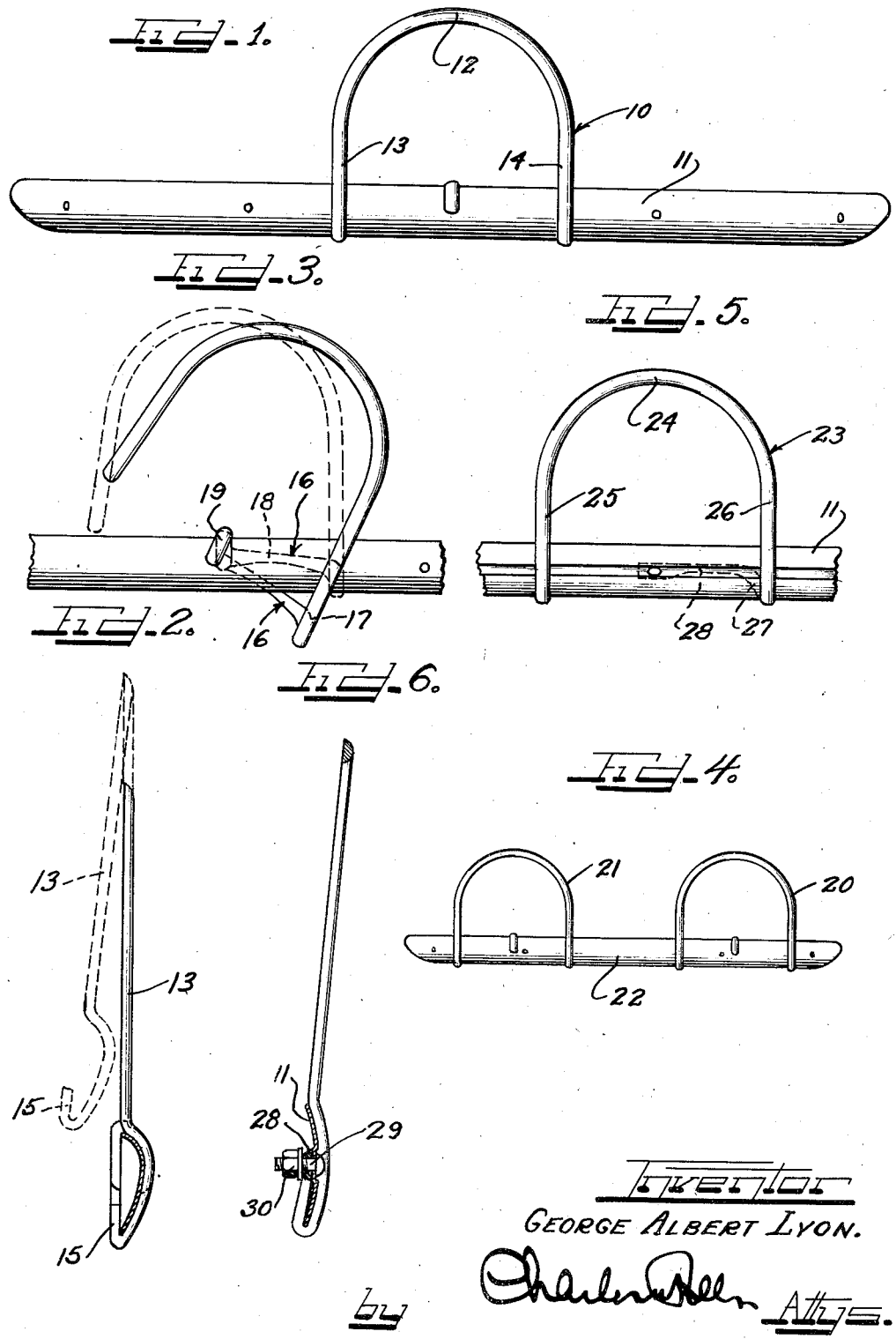
Inventor
GEORGE ALBERT LYON.
by Charles W. Allen Attys.

Aug. 8, 1939. G. A. LYON 2,168,354
ORNAMENTAL GRILLE AND FENDER GUARD
Filed July 29, 1937 3 Sheets-Sheet 2
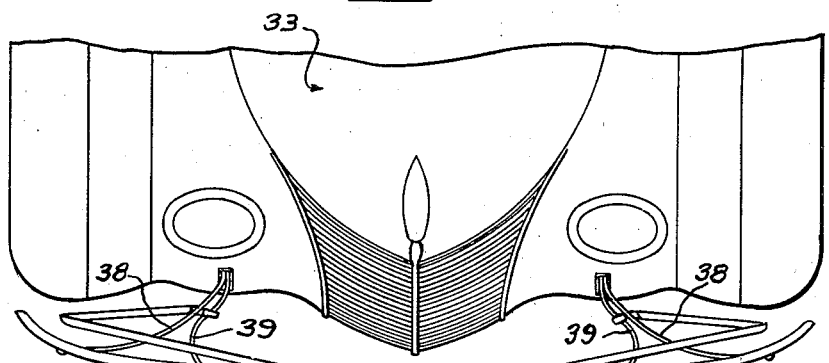
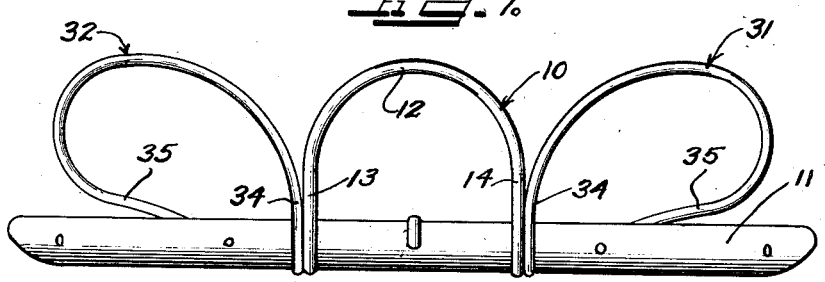
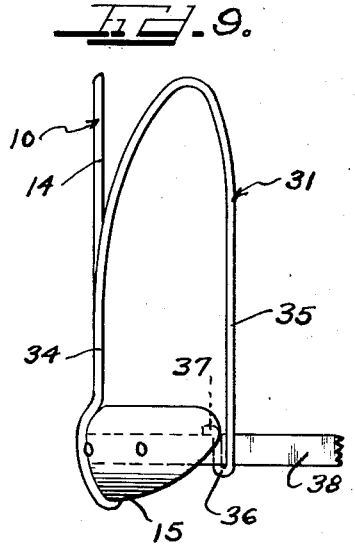
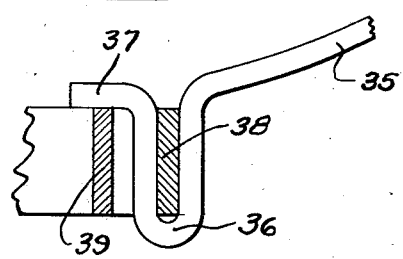
Inventor
GEORGE ALBERT LYON.
by
Attys.

Aug. 8, 1939.  G. A. LYON  2,168,354
ORNAMENTAL GRILLE AND FENDER GUARD
Filed July 29, 1937  3 Sheets-Sheet 3
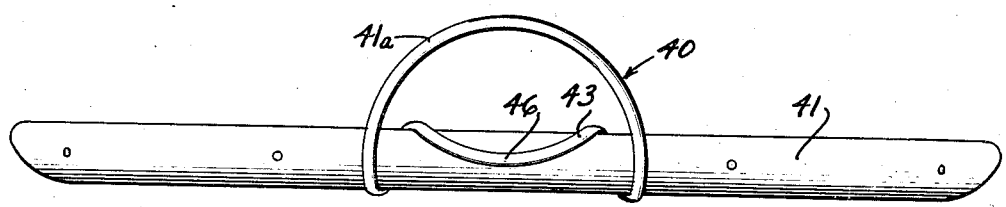
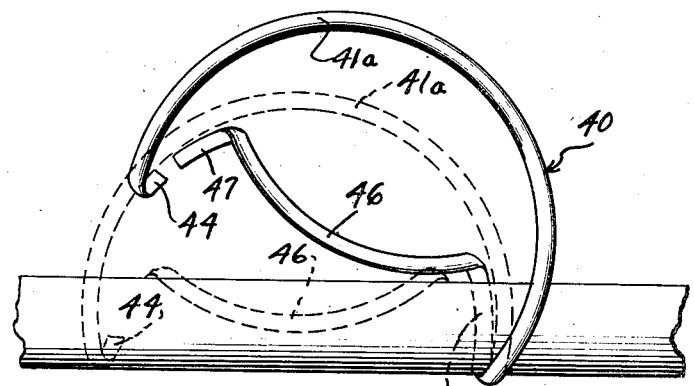
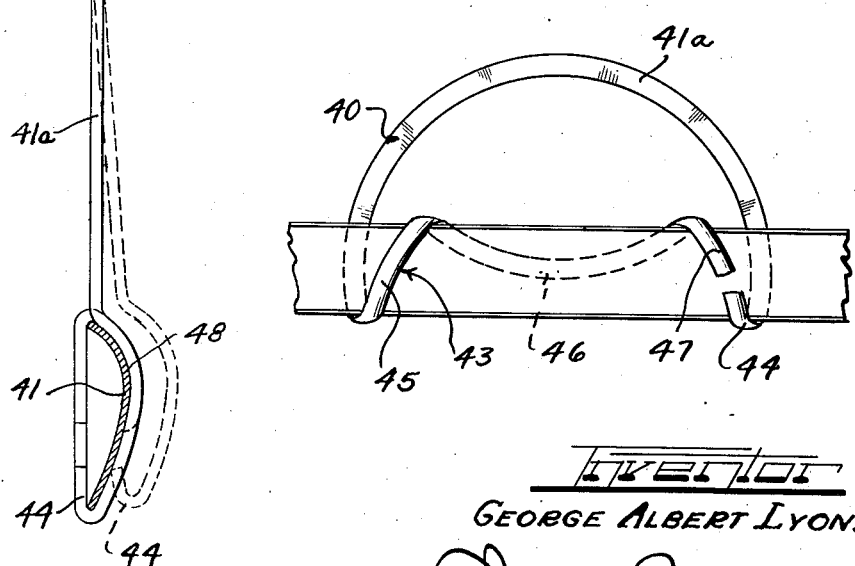
Inventor
GEORGE ALBERT LYON.
by Patented Aug. 8, 1939

2,168,354

UNITED STATES PATENT OFFICE 2,168,354

ORNAMENTAL GRILLE AND FENDER GUARD

George Albert Lyon, Allenhurst, N. J.

Application July 29, 1937, Serial No. 156,281

20 Claims. (Cl. 293—55)

This invention relates to ornamental grille and fender guards, and more particularly to ornamental auxiliary impact members which will increase the protection afforded by a vehicle bumper. Although the usual vehicle bumper or impact member which is universally employed on automobiles of the present day is satisfactory under most circumstances, it has been found that in many instances it is desirable to increase the protection which is afforded by the bumper or impact member by mounting thereon an auxiliary guard or impact member which extends upwardly from the main bumper. This has been found to be particularly desirable where relatively expensive cast grilled radiator front and expensive fender constructions are employed on the vehicle. The increased protection which is afforded by the auxiliary impact member prevents overhanging objects or unusually high bumpers on other vehicles from riding over the top of the main bumper and breaking or crushing the cast grilled radiator front and fenders.

In view of the fact that the auxiliary impact member can only be secured at its lower end, it is highly important that it be constructed of material which is sufficiently strong to resist the usual impacts to which a vehicle bumper is subjected and also that it be secured to the vehicle in such a manner that it cannot be ripped off. From a commercial standpoint, it is also desirable that the auxiliary impact member or guard be equipped with mounting means which will permit the impact member or guard to be readily and quickly mounted on a vehicle bumper and preferably with a minimum amount of alteration to the form of construction of the bumper.

It is an object of this invention to provide a novel ornamental grille and fender guard having the above highly desirable characteristics.

Another object of this invention is to provide a novel auxiliary impact member for bumpers which is economical to manufacture, which is readily and quickly assembled on the usual form of vehicle bumper, and which is rugged and reliable in use.

A further object of this invention is to provide a novel bumper accessory or auxiliary impact member which may be detachably mounted on a vehicle bumper by means carried solely by the auxiliary impact member.

Another and further object of this invention is to provide an auxiliary impact member for bumpers having novel means thereon for detachably securing the same to the bumper.

Another and still further object of this invention is to provide a novel assembly of auxiliary impact members of a novel form which will increase the protection to an automative vehicle which is afforded by the usual bumper construction.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a front elevational view of a bumper having an auxiliary impact member thereon embodying features of the present invention;

Figure 2 is a side elevational view, partly in cross-section, of the auxiliary impact member shown in Figure 1;

Figure 3 illustrates the manner in which the auxiliary impact member of Figure 1 is assembled on a vehicle bumper;

Figure 4 illustrates two auxiliary impact members of the form shown in Figure 1 mounted on a vehicle bumper;

Figure 5 is a front elevational view of an auxiliary impact member which is generally similar in shape to that shown in Figure 1, but which is provided with a different means for securing the same to a vehicle bumper;

Figure 6 is a side elevational view, partly in cross section, of the auxiliary impact member shown in Figure 5;

Figure 7 illustrates a different embodiment of the present invention, in which a plurality of auxiliary impact members are mounted on a vehicle bumper, the central member of which is the same as that shown in Figure 1;

Figure 8 is a top view of the front portion of an automobile which is equipped with the three auxiliary impact members shown in Figure 7;

Figure 9 is a side elevational view, showing one of the outer auxiliary impact members of Figures 7 and 8;

Figure 10 illustrates the manner in which the rear end of each outer auxiliary impact member of Figures 7 and 8 is secured to the vehicle;

Figure 11 is a front elevational view of a different form of auxiliary impact member constructed in accordance with the teachings of the present invention;

Figure 12 is a rear elevational view of the auxiliary impact member of Figure 11;

Figure 13 is a side elevational view, partly in cross-section, of the auxiliary impact member of Figure 11; and Figure 14 illustrates the manner in which the auxiliary impact member of Figure 11 is assembled on a vehicle bumper.

The embodiment of this invention illustrated in Figures 1 to 3 of the drawings includes an ornamental auxiliary impact member or bumper accessory 10 which is centrally mounted on a main bumper or impact member 11. As will at once be apparent from an inspection of these three figures, the auxiliary impact member 10 is formed in the shape of an inverted U, including a crown portion 12 and legs 13 and 14. A portion of the legs 13 and 14 is shaped to intimately overlie and engage the front face of the bumper 11.

As may be seen best in Figure 2 of the drawings, the leg 13 terminates in an upturned portion 15 which is adapted to engage the rear face of the bumper 11. The end portion 16 of the leg 14 which is initially substantially longer than the end portion of the leg 13 is first bent back on itself for a distance equal to substantially one-half of the vertical width of the bumper 11, as indicated at 17, and then it is bent to extend approximately half way across the open face of the U, as indicated at 18. At approximately the midpoint of the open face of the U, the end portion 16 is bent upwardly, forwardly and downwardly to form a hook-shaped tip 19 which is adapted to be snapped over the top of the bumper 11.

While any of a wide variety of materials may be employed in constructing the auxiliary impact members, it has been found that a suitable grade of spring steel or some other equivalent resilient metal is preferable in the construction of auxiliary impact members embodying the principles of the present invention.

The manner in which the auxiliary impact 10 is mounted on the bumper 11 is illustrated in Figure 3 of the drawings. The hook-shaped tip 19 and the cross piece 18 of the impact member 10 is first slipped up behind the bumper 11, and the tip portion 19 hooked over the bumper 11, the impact member 10 being held in the position shown by the full lines in Figure 3. The impact member 10 is then pivoted in a counter-clockwise direction about the tip portion 19, as indicated by the dotted lines in Figure 3. As is indicated by the dotted lines in Figure 2, the normal position of the leg 13 in its unsprung position is slightly to the rear of the front face of the bumper 11. As the upturned end portion 15 of the leg 13 approaches the top of the bumper 11, the leg 13 is swung outwardly so that the upturned portion 15 rides on the front face of the bumper and finally snaps into position behind the bumper, as is indicated by the full lines in Figure 2. Due to the fact that the portions 15 and 17 hook under the bumper 11 and the tip portion 19 hooks down over the bumper 11, it is apparent that a very firm and secure engagement is made between the impact member 10 and the bumper 11. Furthermore, it is to be noted that this particular design adapts itself to being mounted on a very wide variety of bumpers without appreciably changing the general shape or design of the impact member 10. Indeed, the only portion which need be altered to provide for a different style of bumper is to change the shape of the portions 13 and 14 which intimately overlie the front face of the bumper.

It will thus be seen that I have provided an extraordinarily simple and yet effective auxiliary impact member for vehicle bumpers which is economical to manufacture, which may quickly and easily be assembled on a vehicle bumper by an unskilled person, and which is rugged and reliable in use.

In Figure 4 of the drawings, I have shown an assembly of two auxiliary impact members 20 and 21 mounted on a vehicle bumper 22. The auxiliary impact members 20 and 21 are formed in precisely the same manner as that described in connection with Figures 1 to 3, and are assembled on the bumper 22 in the manner shown in Figure 3. By providing two auxiliary impact members in place of a single centrally disposed impact member, it is apparent that the protection which is afforded by the bumper assembly is still further increased.

In Figures 5 and 6, a slightly modified form of the invention is shown. In this form of the invention, a U-shaped auxiliary impact member 23 is employed having a central dome-shaped portion 24 and legs 25 and 26. The lower end of the leg 25 terminates in an upturned hook portion which is precisely the same as that shown at 15 in Figure 2. The leg 26 is provided with an upturned portion 27 and a laterally extending portion 28, the end of which portion 28, instead of being bent upwardly and over the bumper 11, is apertured for the reception of a suitable mounting bolt 29 which extends through the bumper 11 and the lateral portion 28 into threaded engagement with a suitable nut 30.

In Figures 7 to 10, there is illustrated a form of the invention in which a centrally disposed impact member 10 of the type shown and described in connection with Figures 1 to 3 is shown mounted on the bumper 11, together with two additional auxiliary impact members 31 and 32. These additional auxiliary impact members 31 and 32 are provided with a different form of means for detachably securing them to an automotive vehicle, the front portion of which is generally indicated in Figure 8 by the reference numeral 33. Each impact member 31 and 32 is formed in the shape of a loop having a leg portion 34 which extends downwardly over the front face of the bumper 11 in intimate contact therewith, and a second leg portion 35 which terminates in a U-shape end portion 36 having a laterally extending tip 37 thereon. The end of the leg 34 is formed in precisely the same manner as the leg 13 of the central auxiliary impact member 10 and terminates in an upturned end portion 15, such as that shown in Figure 2 of the drawings for engaging the rear face of the bumper 11.

As is clearly shown in Figure 8, the leg 35 of each impact member 31 and 32 does not engage the bumper 11, but rather extends into securing engagement with the supporting arms 38 and 39 which support and secure the bumper 11 to the vehicle 33. As is clearly shown in Figure 10, the end of the leg 35 of each impact member 31 and 32 is hooked under the supporting arm 38, and the tip portion 37 extends across the top of the supporting arm 39. It will thus be apparent that the auxiliary impact members 31 and 32 may be readily and quickly mounted in desired position on the vehicle 33 by moving the tip portion up between the widened portion adjacent the bumper 11 and between the arms 38 and 39, so that the U-shaped portion extends around the arm 38. The entire leg 35 is then moved backwardly until the tip portion 37 rides over the top of the arm 39, and the leg of the U-shaped portion 36 between the arms 38 and 39 is tightly wedged therebetween. The leg 34 of each impact member 31 and 32 is then sprung downwardly over the front face of the bumper 11 to permit the upturned end portion 15 thereof to be hooked under the bumper 11.

From the above description, it will be apparent that I have provided a very simple and yet effective assembly of auxiliary impact members for mounting on the front of a motor vehicle which will greatly increase the protection afforded the various relatively expensive front portions of the vehicle, including the ornamental radiator grille and fenders.

In Figures 11 to 14 of the drawings, I have illustrated a different embodiment of this invention. An auxiliary impact member 40 is shown as being mounted on a bumper 41 by having portions thereof adapted to be snapped around the bumper into securing engagement therewith. More particularly, the impact member 40 includes a substantially semi-circular impact portion 41ª which terminates in two end portions 43 and 44. The end portion 44 is a relatively short upturned end generally similar in shape and function to the upturned end 15 of the impact member 10 shown in Figure 2, which is adapted to engage the rear face of the bumper 41. The end portion 43 is a relatively long portion which extends up behind the bumper 41 in a portion 45, then downwardly and across the front face of the bumper 41 in an arcuate-shaped portion 46, and finally hooks over the bumper 41 with a tip portion 47. The lower part of each side of the semi-circular portion 41ª is adapted to intimately overlie the front face of the bumper 41 in the manner indicated at 48 in Figure 13.

The impact member 40 may, of course, be formed in a wide variety of manners, but it is preferably formed from a circular piece of resilient metal stock, such, for example, as spring steel which is severed at one point around the circle and then folded into the shape shown in Figure 11. The manner in which the impact member 40 is mounted on the bumper 41 is illustrated in Figure 14. The right side of the impact member 40 is first hooked under the bumper 41 by passing the main portion 41ª up over the front face of the bumper 41 and the arcuate portion 46 up behind the rear of the bumper 41, until the impact member 40 has assumed the position shown by the full lines in Figure 14. The impact member 40 is then rotated in a counter-clockwise direction until the arcuate portion 46 has been hooked over the top of the bumper 41 in the manner shown by the dotted lines in Figure 14.

As the arcuate portion 46 is being moved down over the upper part of the bumper 41, the left side of the semi-circular portion 41ª is swung outwardly causing the upturned end 44 to ride down over the front face of the bumper 41 until it is snapped under the lower edge of the bumper 41. The action of the upturned end 44 and the position of the left side of the semi-circular portion 41ª as it is being moved down over the front face of the bumper 41 is clearly shown by the dotted lines in Figure 13. It will be seen that the impact member 40 is now firmly and securely attached to the bumper 41.

From the above description of the several embodiments of the invention which have been illustrated by the various figures of the drawings, it will be apparent that I have provided an extraordinarily simple and yet effective auxiliary impact member for vehicle bumpers which may be readily and quickly mounted in desired position on a vehicle and which will be rugged and reliable in use.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture for vehicle bumpers, an auxiliary impact member having means thereon for making a detachable snap-on engagement with a vehicle bumper, said engagement with said bumper being so arranged as to resist tortional forces therein caused by heavy impact blows on any part of said auxiliary impact member.

2. As an article of manufacture for vehicle bumpers, an auxiliary impact member having integral means thereon adapted to make a detachable snap-on engagement with a vehicle bumper, said means constituting the sole attaching means for securing said impact member to said bumper, said engagement with said bumper being so arranged as to resist heavy and sudden torques caused by impact blows on any part of said auxiliary impact member.

3. As an article of manufacture for vehicle bumpers, an auxiliary impact member formed of a single strip of resilient material having a pair of legs, one of said legs being shaped to hook under a vehicle bumper, and the other of said legs being shaped to partially curl around said bumper, thereby to detachably secure said member to said bumper, said engagement of said legs with said bumper being so arranged as to resist tortional forces therein caused by heavy impact blows on any part of said auxiliary impact member.

4. As an article of manufacture for vehicle bumpers, an auxiliary impact member shaped to form a central arcuate impact portion, and having end portions adapted to hook under a vehicle bumper and support the member thereon, said end portions constituting the sole attaching means therefor, said engagement of said end portions with said bumper being so arranged as to resist heavy and sudden torques caused by impact blows on any part of said auxiliary impact member.

5. As an article of manufacture for vehicle bumpers, an auxiliary impact member shaped to form a central arcuate impact portion, and having one short and one long end portion, said short end portion being adapted to hook under a vehicle bumper, and said long end portion being adapted to extend under and upwardly behind said bumper, and finally down over a portion of the front face of said bumper.

6. As an article of manufacture for vehicle bumpers, an auxiliary impact member shaped to form a central arcuate impact portion, and having one short and one long end portion, said short end portion being adapted to hook under a vehicle bumper, and said long end portion being bent to extend part way across said central arcuate portion behind said bumper and terminating in a tip portion bent to hook over said bumper.

7. As an article of manufacture for vehicle bumpers, an auxiliary impact member shaped to form a central arcuate impact portion, and having one short and one long end portion, said end portions being adapted to hook under a vehicle bumper and said long end portions being adapted to extend under and upwardly behind said bumper, then lengthwise of the bumper at the rear thereof, and terminating in a tip portion bent to hook over said bumper.

8. As an article of manufacture for vehicle bumpers, an auxiliary impact member comprising a circular strip of resilient metal stock which has been folded back on itself along a line substantially parallel to a diameter of the circular strip, one of the lines of fold being in close proximity to the ends of the circular strip, thereby providing a short folded end portion and a long folded end portion, said long folded end portion having a central part thereof folded forward on itself.

9. As an article of manufacture for vehicle bumpers, an auxiliary impact member comprising a circular strip of resilient metal stock which has been folded back on itself along a line substantially parallel to a diameter of the circular strip, one of the lines of fold being in close proximity to the ends of the circular strip, thereby providing a short folded end portion and a long folded end portion, said long folded end portion having a central part thereof folded forward on itself along lines of fold substantially parallel to said first lines of fold.

10. As an article of manufacture for vehicle bumpers, an auxiliary impact member comprising a circular strip of resilient metal stock which has been folded back on itself along a line substantially parallel to a diameter of the circular strip, one of the lines of fold being in close proximity to the ends of the circular strip, thereby providing a short folded end portion and a long folded end portion, said long folded end portion having a central part thereof folded forward on itself along lines of fold substantially parallel to said first lines of fold, the vertical distance between said first and second lines of fold being substantially equal to the vertical width of the bumper upon which the impact member is to be mounted.

11. As an article of manufacture for vehicle bumpers, an auxiliary impact member comprising a semi-circular strip of resilient material having one end thereof folded back on itself to form a short upwardly turned end portion and the other end folded back on itself to form a relatively long arcuate shape end portion which extends substantially across but slightly less than the width of said impact member, an intermediate portion of said long end portion being folded forward on itself, said short and long end portions being adapted to hook under and over a vehicle bumper.

12. As an article of manufacture for vehicle bumpers, an auxiliary impact member comprising a semi-circular strip of resilient material having one end thereof folded back on itself to form a short upwardly turned end portion and the other end folded back on itself to form a relatively long arcuate shaped end portion which extends substantially across but slightly less than the width of said impact member, an intermediate portion of said long end portion being folded forward on itself, said long end portion being adapted to extend upwardly behind a vehicle bumper on which the impact member is to be mounted, then downwardly over a portion of the front face of said bumper, and finally to hook over the top of said bumper, and said short end being adapted to hook under said bumper.

13. With a vehicle having a bumper supported thereon by a plurality of arms, the combination of a centrally disposed auxiliary impact member mounted on said bumper, and a pair of additional laterally extending auxiliary impact members one on each side of said first auxiliary impact member, each of said additional auxiliary impact members having one end thereof detachably secured to said bumper and the other end thereof detachably secured to said bumper supporting arms.

14. With a vehicle having a bumper supported thereon by a plurality of arms, the combination of a centrally disposed auxiliary impact member mounted on said bumper, and a pair of additional auxiliary impact members one on each side of said first auxiliary impact member, each having one side thereof detachably secured to said bumper and the other side thereof detachably secured to said bumper supporting arms, and the securing engagement for said impact members being provided by folded portions of said members which extend above and below said bumper and said bumper supporting arms.

15. As an article of manufacture, a bumper guard constructed to be applied vertically to the bumper bar and to be angled under pressure in the direction of the length of the bumper bar into wedged retaining engagement with the bar, said guard having angled portions movable in opposite directions to grip the bumper bar and impelled into operative gripping position by pressure applying means, said angled portions including two legs each having a hooked end, one hooked end opening in one direction to engage one edge of the bumper bar and the other hooked end opening in an opposite direction to engage the other end of the bumper bar.

16. As an article of manufacture, a bumper guard comprising a section having one portion formed to fit around the upper edge of said bumper and another portion formed to fit around the lower edge of said bumper, and said section being provided with means for applying forces to said section tending to rotate said section about an axis transverse to the plane of said bumper to keep said portions tightly engaged with the edges of said bumper and retain said guard in place.

17. In a bumper guard structure, means for increasing the impact area of a bumper comprising one portion formed to interlock with the bumper when it is rotated in one direction, a second portion formed to interlock with the bumper when it is rotated in a direction opposite to the first direction, and means acting jointly on said portions for holding said portions in the positions in which they are interlocked with said bumper.

18. In combination with a bumper comprising a front bar and a pair of arms supporting one end of said bar, an auxiliary impact member having one end hooked under one of said arms and over the other of said arms and having the other end hooked under said front bar.

19. In combination with a bumper comprising a front bar and a pair of arms supporting one end of said bar, an auxiliary impact member having one end hooked under one of said arms and over the other of said arms and having the other end extending down over the face of and hooked under said front bar.

20. An auxiliary impact member adapted to be snapped onto a bumper having a front bar supported at one end by a pair of arms, said member comprising a curved bar with one hook at one end adapted to hook under one of said arms and over the other, and a hook at the other end adapted to hook under said front bar.

GEORGE ALBERT LYON.